(12) United States Patent
Erkkilä et al.

(10) Patent No.: US 12,165,441 B2
(45) Date of Patent: Dec. 10, 2024

(54) CONDITION MONITORING OF A VEHICLE

(71) Applicant: EEE INNOVATIONS OY, Espoo (FI)

(72) Inventors: Kimmo Erkkilä, Lohja (FI); Jarmo Leino, Lohja (FI)

(73) Assignee: EE INNOVATIONS OY, Espoo (FI)

( * ) Notice: Subject to any disclaimer, the term of this patent is extended or adjusted under 35 U.S.C. 154(b) by 0 days.

(21) Appl. No.: 17/598,138

(22) PCT Filed: Mar. 25, 2020

(86) PCT No.: PCT/FI2020/050191
§ 371 (c)(1),
(2) Date: Sep. 24, 2021

(87) PCT Pub. No.: WO2020/193863
PCT Pub. Date: Oct. 1, 2020

(65) Prior Publication Data
US 2022/0189215 A1 Jun. 16, 2022

(30) Foreign Application Priority Data
Mar. 25, 2019 (FI) .................................... 20195224

(51) Int. Cl.
*B60W 50/00* (2006.01)
*G07C 5/04* (2006.01)

(52) U.S. Cl.
CPC ............... *G07C 5/04* (2013.01); *B60W 50/00* (2013.01); *B60W 2050/0031* (2013.01);
(Continued)

(58) Field of Classification Search
CPC ..... G07C 5/04; B60W 50/00; B60W 2552/00; B60W 2050/0031; B60W 2050/0083;
(Continued)

(56) References Cited

U.S. PATENT DOCUMENTS 6,334,476 B1 * 1/2002 Okamura ............. C08K 5/5398
525/333.1
9,779,557 B2 * 10/2017 Hauser ................... G07C 5/008
(Continued)

FOREIGN PATENT DOCUMENTS

DE 4419650 A1 7/1995
EP 1978279 A2 10/2008
(Continued)

OTHER PUBLICATIONS

Search Report for Finnish U.S. Appl. No. 20/195,224, dated Oct. 24, 2019, 2 pages.
(Continued)

*Primary Examiner* — Peter D Nolan
*Assistant Examiner* — Roy Rhee
(74) *Attorney, Agent, or Firm* — Lippes Mathias LLP

(57) ABSTRACT

According to an aspect, there is provided a computer-implemented method for condition monitoring of a vehicle. The method comprises applying a dynamic model associated with a vehicle (800), the dynamic model having been determined by obtaining status information from at least one information bus of the vehicle, the status information providing real-time status information about the vehicle (200), obtaining, based on vehicle identity information, vehicle dynamics information (202), obtaining map data representing road characteristics of roads of a geographical area, the map data comprising two-dimensional road map data, three-dimensional road map associated with the roads, and road characteristics data (204), analyzing behavior of the vehicle based on the status information and the vehicle dynamics information (206), and computing a dynamic model for the vehicle by comparing the behavior of the vehicle to the map data (208); analyzing historical changes in at least one calibration parameter associated with the dynamic model of
(Continued)

the vehicle (802); analyzing effects of the three-dimensional road map associated with the roads and the road characteristics data in at least one position on the behavior of the vehicle (804); and determining, based on the analyzed historical changes and the effects, at least one change in at least one vehicle characteristic (806).

24 Claims, 5 Drawing Sheets

(52) U.S. Cl.
CPC . *B60W 2050/0083* (2013.01); *B60W 2510/18* (2013.01); *B60W 2510/22* (2013.01); *B60W 2520/28* (2013.01); *B60W 2530/20* (2013.01); *B60W 2540/18* (2013.01); *B60W 2552/00* (2020.02)

(58) Field of Classification Search
CPC ......... B60W 2510/18; B60W 2510/22; B60W 2520/28; B60W 2530/20; B60W 2540/18
See application file for complete search history.

(56) References Cited

U.S. PATENT DOCUMENTS

| | | |
|---|---|---|
| 2015/0266455 A1 | 9/2015 | Wilson |
| 2017/0024500 A1* | 1/2017 | Sebastian ................ G06F 30/20 |
| 2017/0102293 A1 | 4/2017 | Singh |
| 2017/0146362 A1 | 5/2017 | Bai et al. |
| 2018/0154723 A1 | 6/2018 | Anderson et al. |
| 2018/0231389 A1 | 8/2018 | De Nunzio et al. |
| 2019/0079539 A1 | 3/2019 | Sridhar et al. |

FOREIGN PATENT DOCUMENTS

| | | |
|---|---|---|
| EP | 1978279 A3 | 8/2009 |
| WO | 2014126523 A1 | 8/2014 |
| WO | 2017080471 A1 | 5/2017 |

OTHER PUBLICATIONS

European Search Report for Application No. 20779429.8, dated Nov. 11, 2022, 7 pages.

* cited by examiner

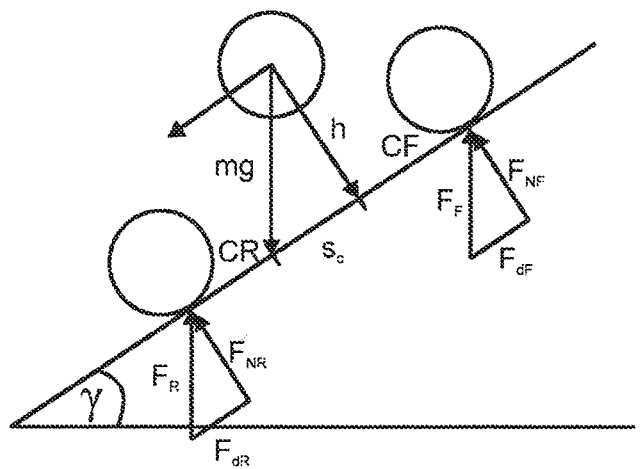

FIG. 3

APPLYING A DYNAMIC MODEL ASSOCIATED WITH THE VEHICLE — 400

CALCULATING, BASED ON THE DYNAMIC MODEL OF THE VEHICLE, AN EFFECTIVE TRAVEL DISTANCE OF A WHEEL OF THE VEHICLE — 402

CALCULATING, BASED ON THE DYNAMIC MODEL OF THE VEHICLE, A MOMENTARY WHEEL GAUGE — 404

CALCULATING, BASED ON THE EFFECTIVE TRAVEL DISTANCE OF A WHEEL OF THE VEHICLE AND THE MOMENTARY WHEEL GAUGE, A MOMENTARY DIRECTION OF THE VEHICLE — 406

CALCULATING, BASED ON THE EFFECTIVE TRAVEL DISTANCE OF THE WHEEL AND THE MOMENTARY DIRECTION OF THE VEHICLE, A POSITION OF THE VEHICLE — 408

FIG. 4

 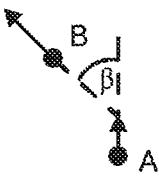

FIG. 5A                    FIG. 5B

CONDITION MONITORING OF A VEHICLE

TECHNICAL FIELD

The present application relates to the field of computer systems, and more particularly to a computer-implemented method and an apparatus for condition monitoring of a vehicle.

BACKGROUND

Each vehicle, for example, a car or a truck, has certain characteristics associated with the vehicle, for example, power, weight, wheelbase, track etc. Each of characteristics has an effect on how the vehicle behaves while it is used. Further, for example, in different weather conditions the vehicle may behave differently.

When the vehicle is used, it may experience various defects or faults, for example, brake and tyre problems. Something these defects or faults may be registered immediately, for example, in a case of a flat tyre. However, many of the defects or faults associated with the vehicle may be difficult to register, for example, a slightly reduced tyre pressure, a shock absorber fault or a fault in a chassis of the vehicle.

There is a need for a solution that would enable an accurate condition monitoring of a vehicle.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the invention to provide a solution that would enable an accurate condition monitoring of a vehicle.

This objective is achieved by the features of the independent claims. Further embodiments and examples of the invention are apparent from the dependent claims, the description and the figures.

According to a first aspect, there is provided a computer-implemented method for condition monitoring of a vehicle. The method comprises applying a dynamic model associated with a vehicle, the dynamic model having been determined by obtaining status information originating from at least one information bus of the vehicle, the status information providing real-time status information about the vehicle during the use of the vehicle, obtaining, based on vehicle identity information, vehicle dynamics information providing characteristics associated with the vehicle, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data, the dynamic model enabling at least one of an estimation of the performance of the vehicle, observation of changes associated with the vehicle and observation of changes in driving conditions of the vehicle; analyzing historical changes in at least one calibration parameter associated with the dynamic model of the vehicle; analyzing effects of the three-dimensional road map associated with the roads and the road characteristics data in at least one position on the behavior of the vehicle; and determining, based on the analyzed historical changes and the effects, at least one change in at least one vehicle characteristic.

According to a second aspect, there is provided a computer-implemented method for condition monitoring of a vehicle. The method comprises applying a dynamic model associated with a vehicle, the dynamic model having been determined by obtaining status information from at least one information bus of the vehicle, the status information providing real-time status information about the vehicle, obtaining, based on vehicle identity information, vehicle dynamics information, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data; analyzing historical changes in at least one calibration parameter associated with the dynamic model of the vehicle; analyzing effects of the three-dimensional road map associated with the roads and the road characteristics data in at least one position on the behavior of the vehicle; and determining, based on the analyzed historical changes and the effects, at least one change in at least one vehicle characteristic.

In a further implementation form of the first or second aspect, the status information comprises at least one of a motor power, tyre speeds, a steering wheel position, vehicle system information, traction control information, vehicle stabilization system information and anti-lock braking system information.

In a further implementation form of the first or second aspect, obtaining, based on vehicle identity information, vehicle dynamics information comprises obtaining initial vehicle dynamics information associated with a model or type of the vehicle from at least one external data source.

In a further implementation form of the first or second aspect, obtaining, based on vehicle identity information, vehicle dynamics information comprises obtaining supplemental vehicle dynamics information based on real-time vehicle dynamics data obtained from the vehicle.

In a further implementation form of the first or second aspect, the road characteristics data comprises at least one of road quality data, road irregularity data and data about local deviations associated with the road.

In a further implementation form of the first or second aspect, the method further comprises combining the dynamic model with the road characteristics data to enhance the calculation of the position of the vehicle.

In a further implementation form of the first or second aspect, the three-dimensional road data comprises road inclination data, and the method further comprises combining the dynamic model with the road inclination data to enhance the calculation of the position of the vehicle.

In a further implementation form of the first or second aspect, the at least one calibration parameter comprises calibration parameters associated with elasticity of a tyre and a dynamic track width, and determining, based on the analyzed historical changes and the effects, at least one change in at least one vehicle characteristic comprises determining at least one change in a tyre characteristic.

In a further implementation form of the first or second aspect, the at least one calibration parameter comprises a tyre-specific speed and/or distance calibration parameter, and determining, based on the analyzed historical changes and the effects, at least one change in at least one vehicle characteristic comprises determining at least one change in a tyre characteristic.

In a further implementation form of the first or second aspect, the at least one change in the tyre characteristic comprises at least one of the following: a reduced tyre pressure, a tyre imbalance, a shock absorber fault, a fault in a chassis of the vehicle, deformation of a tyre, a wear of a tyre, an uneven wear of a tyre, and a tyre body damage.

In a further implementation form of the first or second aspect, the at least one calibration parameter comprises a speed and/or distance calibration parameter of at least one tyre of the vehicle, and determining, based on the analyzed historical changes and the effects, at least one change in at least one vehicle characteristic comprises determining a dragging brake associated with at least one tyre.

According to a third aspect, there is provided an apparatus for condition monitoring of a vehicle. The apparatus comprises at least one processor and at least one memory connected to the at least one processor. The at least one memory stores program instructions that, when executed by the at least one processor, cause the apparatus to apply a dynamic model associated with a vehicle, the dynamic model having been determined by obtaining status information originating from at least one information bus of the vehicle, the status information providing real-time status information about the vehicle during the use of the vehicle, obtaining, based on vehicle identity information, vehicle dynamics information providing characteristics associated with the vehicle, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data, the dynamic model enabling at least one of an estimation of the performance of the vehicle, observation of changes associated with the vehicle and observation of changes in driving conditions of the vehicle; analyze historical changes in at least one calibration parameter associated with the dynamic model of the vehicle; analyze effects of the three-dimensional road map associated with the roads and the road characteristics data in at least one position on the behavior of the vehicle; and determine, based on the analyzed historical changes and the effects, at least one change in at least one vehicle characteristic.

According to a fourth aspect, there is provided an apparatus for condition monitoring of a vehicle. The apparatus comprises at least one processor and at least one memory connected to the at least one processor. The at least one memory stores program instructions that, when executed by the at least one processor, cause the apparatus to apply a dynamic model associated with a vehicle, the dynamic model having been determined by obtaining status information from at least one information bus of the vehicle, the status information providing real-time status information about the vehicle, obtaining, based on vehicle identity information, vehicle dynamics information, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data; analyze historical changes in at least one calibration parameter associated with the dynamic model of the vehicle; analyze effects of the three-dimensional road map associated with the roads and the road characteristics data in at least one position on the behavior of the vehicle; and determine, based on the analyzed historical changes and the effects, at least one change in at least one vehicle characteristic.

In a further implementation form of the third or fourth aspect, the status information comprises at least one of a motor power, tyre speeds, a steering wheel position, vehicle system information, traction control information, vehicle stabilization system information and anti-lock braking system information.

In a further implementation form of the third or fourth aspect, obtaining, based on vehicle identity information, vehicle dynamics information comprises obtaining initial vehicle dynamics information associated with a model or type of the vehicle from at least one external data source.

In a further implementation form of the third or fourth aspect, obtaining, based on vehicle identity information, vehicle dynamics information comprises obtaining supplemental vehicle dynamics information based on real-time vehicle dynamics data obtained from the vehicle.

In a further implementation form of the third or fourth aspect, the road characteristics data comprises at least one of road quality data, road irregularity data and data about local deviations associated with the road.

In a further implementation form of the third or fourth aspect, the at least one memory stores program instructions that, when executed by the at least one processor, cause the apparatus to combine the dynamic model with the road characteristics data to enhance the calculation of the position of the vehicle.

In a further implementation form of the third or fourth aspect, the three-dimensional road data comprises road inclination data, and the method further comprises combining the dynamic model with the road inclination data to enhance the calculation of the position of the vehicle.

In a further implementation form of the third or fourth aspect, the at least one calibration parameter comprises calibration parameters associated with elasticity of a tyre and a dynamic track width, and determining, based on the analyzed historical changes and the effects, at least one change in at least one vehicle characteristic comprises determining at least one change in a tyre characteristic.

In a further implementation form of the third or fourth aspect, the at least one calibration parameter comprises a tyre-specific speed and/or distance calibration parameter, and determining, based on the analyzed historical changes and the effects, at least one change in at least one vehicle characteristic comprises determining at least one change in a tyre characteristic.

In a further implementation form of the third or fourth aspect, the at least one change in the tyre characteristic comprises at least one of the following: a reduced tyre pressure, a tyre imbalance, a shock absorber fault, a fault in a chassis of the vehicle, deformation of a tyre, a wear of a tyre, an uneven wear of a tyre, and a tyre body damage.

In a further implementation form of the third or fourth aspect, the at least one calibration parameter comprises a speed and/or distance calibration parameter of at least one tyre of the vehicle, and determining, based on the analyzed historical changes and the effects, at least one change in at least one vehicle characteristic comprises determining a dragging brake associated with at least one tyre.

According to a fifth aspect, a computer program is provided. The computer program comprises instructions which, when the program is executed by a computer, cause the computer to carry out the method of any the first aspect.

According to a sixth aspect, a computer-readable medium is provided. The computer-readable medium comprises instructions which when, executed by a computer, cause the computer to carry out the method of the first aspect.

According to a seventh aspect, there is provided an apparatus for condition monitoring of a vehicle. The apparatus comprises at least one processor configured to apply a dynamic model associated with a vehicle, the dynamic model having been determined by obtaining status information originating from at least one information bus of the vehicle, the status information providing real-time status information about the vehicle during the use of the vehicle, obtaining, based on vehicle identity information, vehicle dynamics information providing characteristics associated with the vehicle, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data, the dynamic model enabling at least one of an estimation of the performance of the vehicle, observation of changes associated with the vehicle and observation of changes in driving conditions of the vehicle; analyze historical changes in at least one calibration parameter associated with the dynamic model of the vehicle; analyze effects of the three-dimensional road map associated with the roads and the road characteristics data in at least one position on the behavior of the vehicle; and determine, based on the analyzed historical changes and the effects, at least one change in at least one vehicle characteristic.

According to an eighth aspect, there is provided an apparatus for condition monitoring of a vehicle. The apparatus comprises at least one processor configured to apply a dynamic model associated with a vehicle, the dynamic model having been determined by obtaining status information from at least one information bus of the vehicle, the status information providing real-time status information about the vehicle, obtaining, based on vehicle identity information, vehicle dynamics information, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data; analyze historical changes in at least one calibration parameter associated with the dynamic model of the vehicle; analyze effects of the three-dimensional road map associated with the roads and the road characteristics data in at least one position on the behavior of the vehicle; and determine, based on the analyzed historical changes and the effects, at least one change in at least one vehicle characteristic.

According to a ninth aspect, there is provided an apparatus for condition monitoring of a vehicle. The apparatus comprises means for applying a dynamic model associated with a vehicle, the dynamic model having been determined by obtaining status information originating from at least one information bus of the vehicle, the status information providing real-time status information about the vehicle during the use of the vehicle, obtaining, based on vehicle identity information, vehicle dynamics information providing characteristics associated with the vehicle, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data, the dynamic model enabling at least one of an estimation of the performance of the vehicle, observation of changes associated with the vehicle and observation of changes in driving conditions of the vehicle; means for analyzing historical changes in at least one calibration parameter associated with the dynamic model of the vehicle; means for analyzing effects of the three-dimensional road map associated with the roads and the road characteristics data in at least one position on the behavior of the vehicle; and means for determining, based on the analyzed historical changes and the effects, at least one change in at least one vehicle characteristic.

According to a tenth aspect, there is provided an apparatus for condition monitoring of a vehicle. The apparatus comprises means for applying a dynamic model associated with a vehicle, the dynamic model having been determined by obtaining status information from at least one information bus of the vehicle, the status information providing real-time status information about the vehicle, obtaining, based on vehicle identity information, vehicle dynamics information, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data; means for analyzing historical changes in at least one calibration parameter associated with the dynamic model of the vehicle; means for analyzing effects of the three-dimensional road map associated with the roads and the road characteristics data in at least one position on the behavior of the vehicle; and means for determining, based on the analyzed historical changes and the effects, at least one change in at least one vehicle characteristic.

BRIEF DESCRIPTION OF THE DRAWINGS

In the following examples are described in more detail with reference to the attached figures and drawings, in which:

FIG. 3 illustrates calculation of the change of wheel normal load caused by the road longitudinal inclination in front and rear axles.

FIG. 4 illustrates a computer-implemented method for positioning a vehicle.

FIGS. 5A and 5B illustrate graphs associated with a turning vehicle.

In the following identical reference signs refer to identical or at least functionally equivalent features.

DETAILED DESCRIPTION

In the following description, reference is made to the accompanying drawings, which form part of the disclosure, and in which are shown, by way of illustration, specific aspects and examples in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit or other means to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various exemplary aspects described herein may be combined with each other, unless specifically noted otherwise.

Figure 1:
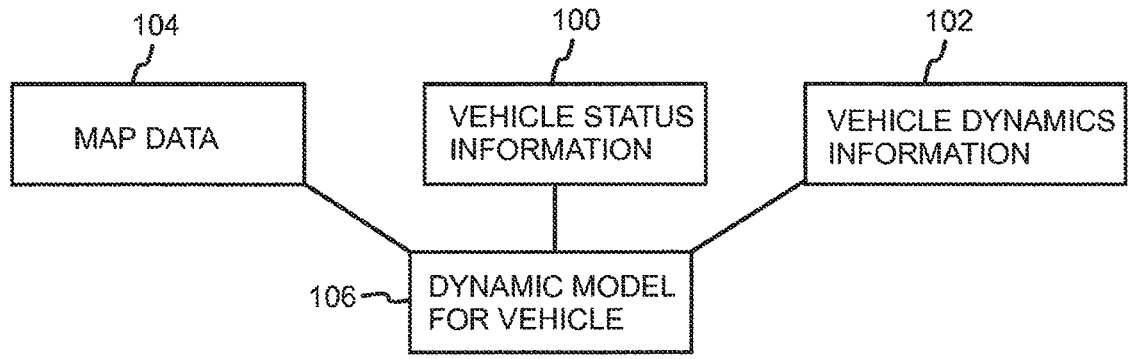
FIG. 1 illustrates a block diagram representing information based on which it is possible to determine and model behavior of a vehicle.

FIG. 1 illustrates a block diagram representing information based on which it is possible to determine and model behavior of a vehicle. Vehicle status information 100 refers to information that can be obtained or can originate from the vehicle itself, for example, via one or more information buses of the vehicle while the vehicle is in use. The vehicle status information comprises, for example, at least one of motor power, tyre speeds, a steering wheel position, vehicle system information, traction control information, vehicle stabilization system information and anti-lock braking system information.

Vehicle dynamics information 102 may be obtained based on vehicle identity information, for example, from one or more external data sources. The vehicle dynamics information 102 may provide characteristics associated with the vehicle. The characteristics may comprise initial values, for example, for a mass of the vehicle, powertrain efficiency coefficient or map, a track width, a wheelbase, location of the center of gravity, and the moment of inertia along different axes of the vehicle and the moment of inertia associated with rotating masses. If no vehicle specific dynamics information is not available, it is possible to use vehicle dynamics information that is common for this vehicle type. When the vehicle is used, the vehicle dynamics information may be updated based on analysis of the behavior of the vehicle. Further, vehicle dynamics information determined for a specific vehicle may be used as preliminary knowledge for other similar vehicles.

Map data 104 may represent road characteristics of roads of a geographical area, and the map data 104 may comprise two-dimensional road map data, three-dimensional map data associated with the roads, and road characteristics data. The three-dimensional road map data may comprise information about road height data and road inclination data. The road characteristics data may comprise at least one of road quality data, road irregularity data and data about local deviations associated with the road.

Based on the vehicle status information 100, vehicle dynamics information 102 and the map data 104 it is possible to determine a dynamic model for the vehicle. The dynamic model may then enable an estimation of the performance of the vehicle, observation of changes associated with the vehicle and observation of changes in driving conditions of the vehicle. Further, in an example embodiment, updated map data may be subsequently received and the updated map data may be used in determining or updating the dynamic model of the vehicle.

In an example embodiment, the dynamic model may be calculated and/or updated by a vehicle-mounted apparatus. In another example embodiment, the dynamic model may be calculated and/or updated by a network-based service that may receive information from one or more vehicles.

Further, the illustrated solution enables a fusion of the vehicle status information 100 obtained from the vehicle and the map data. This means that the map data can be enriched based on the vehicle status information 100.

Figure 2:
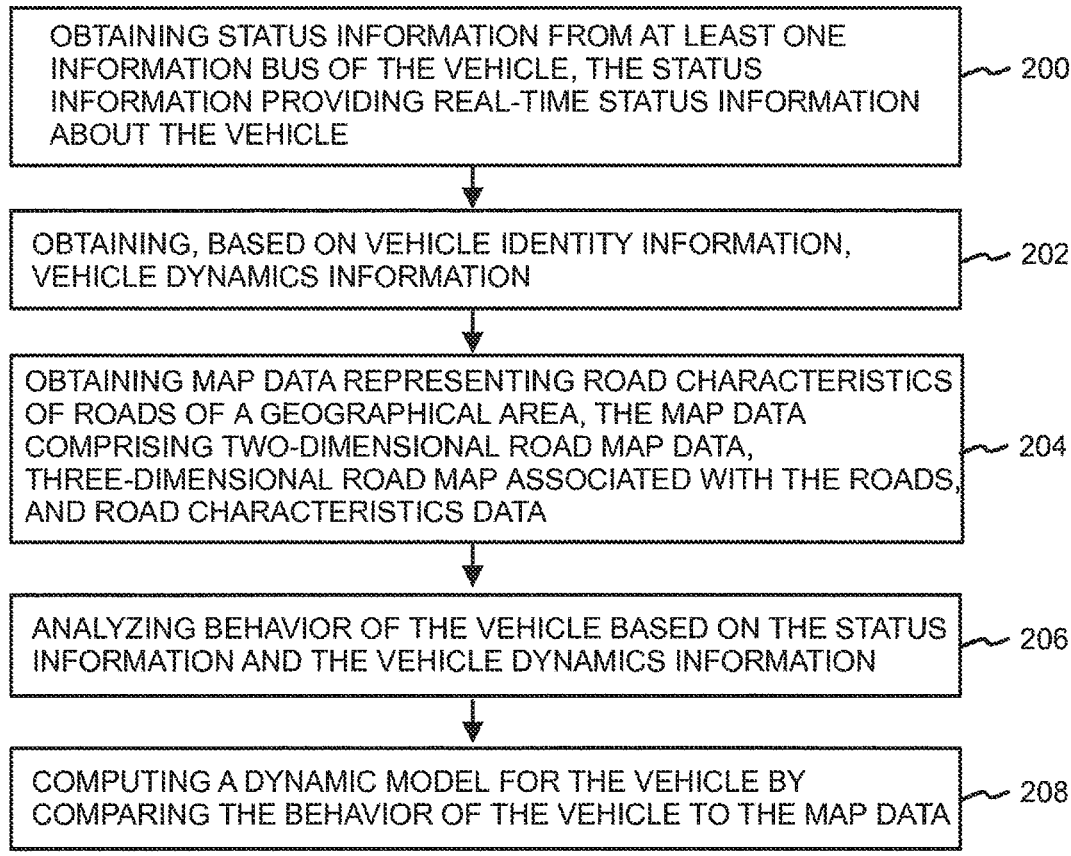
FIG. 2 illustrates a flow diagram of a method for modelling dynamics of a vehicle.

FIG. 2 illustrates a computer-implemented method for modelling dynamics of a vehicle. The vehicle may be any vehicle travelling on a road, for example, an autonomous vehicle, a passenger car, a truck, a motorcycle etc.

At 200, status information is obtained from at least one information bus of the vehicle, the status information providing status information or real-time status information about the vehicle.

At 202, vehicle dynamics information representing vehicle dynamics is obtained based on vehicle identity information.

At 204, map data representing road characteristics of roads of a geographical area, the map data comprising two-dimensional road map data, three-dimensional road map associated with the roads, and road characteristics data is obtained.

At 206, behavior of the vehicle is analyzed based on the status information and the vehicle dynamics information.

At 208, a dynamic model for the vehicle is calculated by comparing the behavior of the vehicle to the map data.

The dynamic model of the vehicle can be used in application in which an accurate vehicle representation is needed. For example, based on the dynamic model, it is possible to calculate a presumed behavior of the vehicle in various driving conditions. If an actual behavior of the vehicle deviates from the presumed behavior of the vehicle, this is caused either by changes in driving conditions or changes in the vehicle.

The dynamic model of the vehicle may define a set of vehicle-specific calibration parameters. These calibration parameters may represent how the vehicle behaves in various driving situations.

The dynamic model of the vehicle may involve a set of various parameters or calibration parameters, for example, one or more of the following: 1) a mass of the vehicle, 2) powertrain efficiency coefficient or map, 3) a track width, 4) a wheelbase, 5) location of the center of gravity, 6) the moment of inertia along different axes of the vehicle and the moment of inertia associated with rotating masses, 7) effective rolling circumferences of the wheels, 8) an effect of the circumferential force of a wheel to the rolling circumferences, and 9) overall flexibility in longitudinal and lateral directions in weight of the transition situations caused, for example, by the wheels, the car chassis structure and the car body.

The mass of the vehicle may be obtained from an external data source, it can be manually input or a mass estimation may be used based on the vehicle type. When calculating the dynamic model of the vehicle, the mass of the vehicle can be made more accurate by comparing the effect of the energy produced by a motor of the vehicle to state of motion of the vehicle, taking into account also, for example, at least one of changes in vehicle speed, altitude changes, the amount of work performed by the motor of the vehicle, efficiencies, driving resistances and road quality factors.

In the equations below, the following parameters are used:
m=mass
PE=engine power
$\mu_P$=powertrain coefficient
t=time
A=frontal area
$C_w$=airdrag coefficient
v=speed
s=distance
$v_2$=speed at point 2
$v_1$=speed at point 1
g=gravity
$h_2$=altitude at point 2
$h_1$=altitude at point 1
$\mu_R$=rolling resistance
$\mu_A$=PAC$_w$ The mass of the vehicle may be estimated as follows:

$$w_w = w_{\Delta w} + w_{\Delta h} + w_R + w_A$$

$$P_E * \mu pt = \frac{1}{2}m(v_2 - v_1)^2 + mg(h_2 - h_1) + mg\mu_R S + \mu_A v^2 S * \frac{1}{2}$$

$$P_E \mu_{pF} \mu_A v^2 S * \frac{1}{2} = \frac{1}{2}m(v_2 - v_1)^2 + mg(h_2 - h_1) + mg\mu_R S =$$

$$m\left(\frac{1}{2}m(v_2 - v_1)^2 + g(h_2 - h_1) + g\mu_R S\right)$$

$$m = \frac{P_E \mu_{pF} \mu_A v^2 S * \frac{1}{2}}{\frac{1}{2}(v_2 - v_1)^2 + g(h_2 - h_1) + g\mu_R S}$$

$$m = \frac{P_E \mu_{pF} PAC_w v^2 S * \frac{1}{2}}{\frac{1}{2}m(v_2 - v_1)^2 + g(h_2 - h_1) + g\mu_R S}$$

Powertrain efficiency information may be obtained from one or more external data sources, manually or based on the vehicle type. Later, the information may be made more accurate by multivariate analysis or statistical analysis.

Track width information may be obtained from one or more external data sources, manually or based on the vehicle type. Later, the information may be made more accurate by multivariate analysis or statistical analysis.

Wheelbase information may be obtained from one or more external data sources, manually or based on the vehicle type. Later, the information may be made more accurate by multivariate analysis or statistical analysis.

Information about the location of the center of gravity may be obtained from one or more external data sources, manually or based on the vehicle type. Later, the information may be made more accurate by multivariate analysis or statistical analysis.

Information about the moment of inertia along different axes of the vehicle and the moment of inertia associated with rotating masses may be obtained from one or more external data sources, manually or based on the vehicle type. Later, the information may be made more accurate by multivariate analysis or statistical analysis.

Effective rolling circumferences of the wheels may be calculated for each wheel by comparing the travelled distance to each other to map data in chosen periods. For each wheel a computational dependency tied to the normal force of the wheel is generated. A momentary normal force of the wheel takes into account a dynamic mass shift of the vehicle, also taking into account road characteristics, for example, road inclinations to different directions. The effect of speed may also be taken into account.

The effect of the circumferential force of a wheel to the rolling circumferences of the wheels is estimated by comparing speed of rotation differences with each other with different tractive forces. The estimation may also take into account road quality characteristics and friction.

Flexibility of the wheels and the chassis in longitudinal and lateral directions in weight transition situations may be determined for each and for each wheel type by using initial values or by searching the values from a library for a similar vehicle and wheel type. The effects of the weight transition in longitudinal and lateral directions are estimated separately because a wheel of the vehicle and chassis structures act differently with forces having different directions. Coefficients representing the dynamics indicate both the change caused by the weight shift to the effective travelling device of each wheel and changes caused by the flexibility to the effective travelling distance of the wheel. The location of the effective contact point affects, for example, to the track width and wheelbase. When computing dynamic coefficients, the map data is utilized, for example, by comparing a turning degree of the vehicle according to the dynamic model in a curve to an expected turning degree based on the map data.

FIG. 3 illustrates calculation of the change of wheel normal load caused by the road longitudinal inclination in front and rear axles. Based on FIG. 3, the following equations can be formed:

$$F_R * WB = mg * (CF + S_C)$$

$$F_R = \frac{mg * (CF + S_C)}{WB}$$

$$S_C = h * \tan(\gamma)$$

$$F_F = \frac{mg * (CR - S_C)}{WB}$$

$$F_R = \frac{mg * (CF + h * \tan(\gamma))}{WB}$$

$$F_F = \frac{mg * (CR - h * \tan(\gamma))}{WB}$$

$$F_{NR} = \cos(\gamma) * F_R$$

$$F_{NF} = \cos(\gamma) * F_F$$

$$C_F = S_{CC-F}$$

$$C_R = S_{CC-R}$$

FIG. 4 illustrates a computer-implemented method for positioning a vehicle. The vehicle may be any vehicle travelling on a road, for example, an autonomous vehicle, a passenger car, a truck, a motorcycle etc.

At 400, a dynamic model associated with a vehicle discussed above is applied. As already discussed, the dynamic model has been determined by obtaining status information originating from at least one information bus of the vehicle, the status information providing real-time status information about the vehicle during the use of the vehicle, obtaining, based on vehicle identity information, vehicle dynamics information providing characteristics associated with the vehicle, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data, the dynamic model enabling at least one of an estimation of the performance of the vehicle, observation of changes associated with the vehicle and observation of changes in driving conditions of the vehicle.

At 402, an effective travel distance of a wheel of the vehicle is calculated based on the dynamic model of the vehicle.

At 404, a momentary track width is calculated based on the dynamic model of the vehicle. At 406, a momentary direction of the vehicle is calculated based on the effective travel distance of a wheel of the vehicle and the momentary track width.

At 408, a position of the vehicle is calculated based on the effective travel distance of the wheel and the momentary direction of the vehicle.

When using the dynamical model of the vehicle, it is possible to calculate an effective travel distance of the wheel of the vehicle is various changing driving conditions. If the dynamical model is not used, wheel transformations and changes in measurements used in the position determination are not taken into account, resulting in an inaccurate position determination.

The three-dimensional map data may comprise also road inclination. When the dynamic model and the road inclination data are combined, the position determination can be made more accurate. For example, an effect of the road inclination to a projection of the track width can be taken into account.

In the following, exemplary equations are presented for the rear axle. Equations for the front axle may be formed similarly.

A starting value for a wheel speed difference between left and right sides by a wheel travel is $$\frac{s_L - s_R}{s_{avg}} = s\Delta\%$$

$$v_{Lcor} = v_L - v_L * s\Delta\%$$

$$v_{Rcor} = v_R - v_R * s\Delta\%$$

A starting value for wheel speed change per speed can be represented as follows:

$$v_{Lcor2} = v_{Lcor} - v_{Lcor} * \text{Speedcor \%}$$

$$v_{Rcor2} = v_{Rcor} - v_{Rcor} * \text{Speedcor \%}$$

The mass detection may be performed using the previously presented equations for the mass of the vehicle.

The following parameters may be obtained from a library to be used as starting values:
TW=track width
h=mass center height
WB=wheelbase
mass center location in x/y directions
turning inertia over x/y/z axles
TF=tyre and suspension flex in x direction (side flex)
TFC=type and suspension flex in z direction (compression flex)

The following equations can be formed, when reviewed together with FIGS. 5A and 5B:

$$TW_{dyn} = TW + \Delta TW_{dyn}$$

$$\Delta TW_{dyn} = F_{RLLat} * TF - F_{RRLat} * TF$$

$$F_{NRLSTAT} = \frac{mg\left(\frac{TW_{dyn}}{2} + h\sin(\alpha)\right)}{TW_{dyn} * \cos(\alpha)} * \cos(\gamma) * \frac{S_{cc-F} + h\tan(\gamma)}{WB}$$

$$F_{NRLSTAT} = \frac{mg\left(\frac{TW_{dyn}}{2} h\sin(\alpha)\right)}{TW_{dyn} * \cos(\alpha)} * \frac{S_{cc-F} + h\tan(\gamma)}{WB}$$

$$F_{NRLDYN} = \frac{-F_{LAT} * \cos(\alpha) * h * S_{CC-F}}{TW_{dyn} * WB} + \frac{F_{LONG} * h}{WB}$$

$$F_{NRLDYN} = \frac{+F_{LAT} * \cos(\alpha) * h * S_{CC-F}}{TW_{dyn} * WB} + \frac{F_{LONG} * h}{WB}$$

$$v_{Ldyn} = v_{LCOR2DYN} - (F_{NRL} * T_{FC} * v_{LCOR2})$$

$$v_{Rdyn} = v_{RCOR2DYN} - (F_{NRL} * T_{FC} * v_{RCOR2})$$

$$R_C = \frac{v_{dyn}}{v_{Rdyn} - v_{Ldyn}} * TW_{dyn} * \cos(\alpha)$$

$$v_{dyn} = \frac{v_{Ldyn} + v_{Rdyn}}{2}$$

$$F_{LAT} = \frac{m * v_{dyn}^2}{R_C}$$

$$F_{LONG} = \frac{\Delta v_{dyn}}{\Delta t} * m$$

$$s = v_{dyn} * t$$

$$\beta = \frac{s}{R_C}$$

$$S_a = \sqrt{2R^2 - 2R^2\cos(\beta)}$$

$$\theta = \sum \beta$$

$$x_{POS} = \sum \sin(\theta) * s_a \cos(\gamma)$$

$$y_{POS} = \sum \cos(\theta) * s_a \cos(\gamma)$$

In the above equations, the following parameters were used:
y=road longitudinal inclination
$R_C$=turning circle
∝=road side inclination
$S_{CC-F}$=Y distance from axle to mass center
$F_{LAT}$=lateral force
$F_{LONG}$=longitudinal force
s=driving distance
β=turning/direction change
$s_a$=position change distance between A and B
θ=direction
$X_{POS}$=position on X axis
$Y_{POS}$=position on Y axis
$TW_{dyn}$=dynamic track width
$F_{NRLSTAT}$=tyre normal force without speed (rear left)

$F_{NRRSTAT}$=tyre normal force without speed (rear right)
$F_{NRLDYN}$=tyre normal force with dynamic weight transfer (rear left)
$F_{NRRDYN}$=tyre normal force with dynamic weight transfer (rear right)
$v_{Ldyn}$=left wheel speed after dynamic corrections
$v_{Rdyn}$=right wheel speed after dynamic corrections The illustrated solution for determining the position accurately may be used in vehicle navigation and especially in real-time navigation and in real-time three-dimensional navigation. The illustrated solution can also be utilized in locations where a satellite position based signal, for example, a GPS signal, is weak on non-existent. These locations may include, for example, closed parking lots, blind spots due to buildings, tunnels and quarries. Further, the illustrated solution may provide a location service in applications in which a single location signal is not sufficient, for example, in autonomous vehicles, metros and trains.

Figure 6:
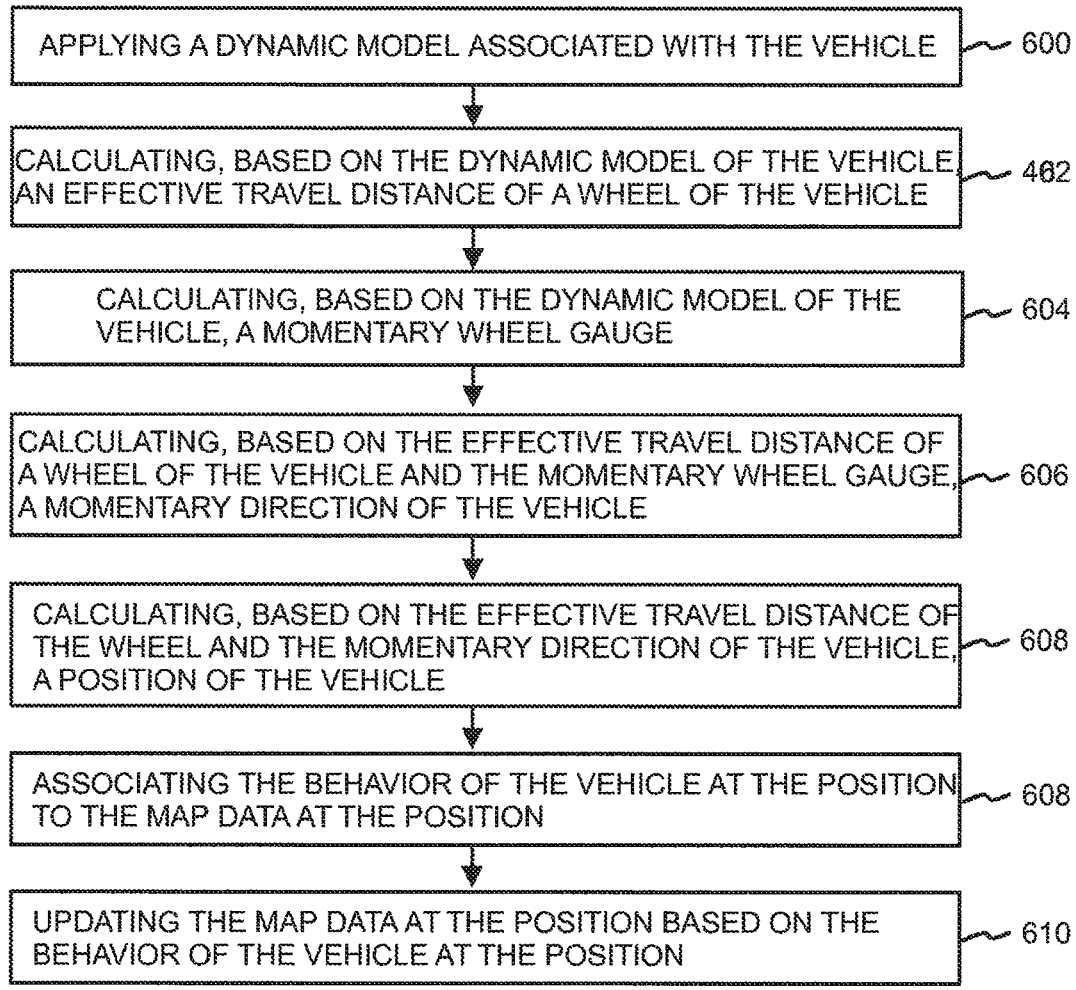
FIG. 6 illustrates a computer-implemented method for enhancing map data.

FIG. 6 illustrates a computer-implemented method for enhancing map data.

At 600, a dynamic model associated with a vehicle discussed above is applied. The vehicle may be any vehicle travelling on a road, for example, an autonomous vehicle, a passenger car, a truck, a motorcycle etc. As already discussed, the dynamic model has been determined by obtaining status information originating from at least one information bus of the vehicle, the status information providing real-time status information about the vehicle during the use of the vehicle, obtaining, based on vehicle identity information, vehicle dynamics information providing characteristics associated with the vehicle, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data, the dynamic model enabling at least one of an estimation of the performance of the vehicle, observation of changes associated with the vehicle and observation of changes in driving conditions of the vehicle.

At 602, an effective travel distance of a wheel of the vehicle is calculated based on the dynamic model of the vehicle.

At 604, a momentary track width is calculated based on the dynamic model of the vehicle.

At 606, a momentary direction of the vehicle is calculated based on the effective travel distance of a wheel of the vehicle and the momentary track width.

At 608, a position of the vehicle is calculated based on the effective travel distance of the wheel and the momentary direction of the vehicle.

At 610, the behavior of the vehicle at the position is associated to the map data at the position.

At 612, the map data at the position is updated based on the behavior of the vehicle at the position.

When the dynamic model of the vehicle and an accurate position of the vehicle has been determined, various observations about the behavior of the vehicle can be accurately linked to the map, for example, to exact map coordinates. Further, a geometry of a road or road segment may be supplemented with information about road inclinations, road grooves and other errors and/or deviations. Further, the updated map data may be used as an enhanced map with all other vehicles travelling the same road or road segment later.

In an example embodiment, if the updated map data is calculated as a vehicle-based solution (i.e. by the apparatus installed in the vehicle), the updated map data may be transmitted to a network-based service that may receive updates from one or more vehicles. The network-based service may then use these updates to enhance map data and to transmit the enhanced map data to other vehicles.

In one embodiment, an expected behavior based on the dynamic model of the vehicle at the calculated position may be compared to the actual behavior of the vehicle at the position. When the vehicle travels on a straight road, road inclination causes a weight shift for the vehicle. This, in turn, has an effect for the effective travel distance of a wheel. Road inclination at the position of the vehicle can be calculated based on the comparison. Further, now that the accurate position of the vehicle is known and the road inclination at the position of the vehicle are known, road inclination at the position in the map data can be updated based on the calculated road inclination.

In an embodiment, a road or a road section of the map data may be divided into road segments. The division may be based on, for example, the fact how a dynamic state of the vehicle changes. As one possible example, the road or road sections may be divided into bends, straight parts, inclination changes etc. An expected behavior of the vehicle at positions within a road segment may be compared to the behavior of the vehicle at the positions within the road segment, and an average inclination may be calculated for the road segment based on the comparison. Now that the average inclination for the road segment is known, the average road inclination for the road segment may be updated in the map data.

Within a specific road segment, momentary road inclinations may be calculated similarly. Due to this, accurate inclination data can be calculated for the road section at all travelled positions.

In an embodiment, several vehicles may provide their behavior data about the same road or road segment. As different vehicles may travel a slightly different path along a specific road or road section, the map data may be enhanced even more to over a more complete part of the road or road section. Further, as different vehicles travel similar paths along the road or road section, road inclination data provided by different vehicles is verified. In one embodiment, the map data may be enhanced with the calculated road inclination data after a predetermined number of vehicles have travelled the road or road section and the analysis results have been verified.

Further, in one embodiment, an average roughness for a road segment may be determined based on an amplitude of momentary speed changes of wheels of the vehicle obtained based on analyzing the behavior of the vehicle when it has travelled along the road segment. The map data for the road segment may then be updated with the average roughness of the road segment. The average roughness may give, for example, valuable information about the overall condition of the road segment.

In one embodiment, the behavior of the vehicle and/or the dynamic model of the vehicle ca also used in determining quality attributes associated with a road or road segment. Amplitude changes of momentary speed changes of wheels of the vehicle in a road segment may be detected. Based on the amplitude changes, degree of at least one road surface irregularity associated with the road segment may be determined. The map data may then be updated based on the degree of at least one irregularity associated with the road segment. In other words, potholes and bumps and their degree and/or severity may be determined based on the amplitude changes.

Further, in one embodiment, a sensitivity dependency maybe calculated for the vehicle, the sensitivity dependency being dependent on speed and mass of the vehicle. Different vehicles can then act as "road sensors", where each sensor may provide a different speed change response for a same pothole or bump of a specific road position. Thus, by comparing the sensitivity dependency of the vehicle to a sensitivity dependency of at least one other vehicle, the sensitivity dependencies of the vehicles may be calibrated based on the comparison. After the calibration, results of different vehicles can be compared against each other.

In one embodiment, vehicle behavior analysis may be performed by wheel basis of a single vehicle. By analyzing each wheel separately, it is possible to determine which wheels of the vehicle, i.e. which side of the vehicle, travelled over an irregularity associated with the road segment. This also enables determination of an accurate position of the irregularity in the road segment.

Figure 7:
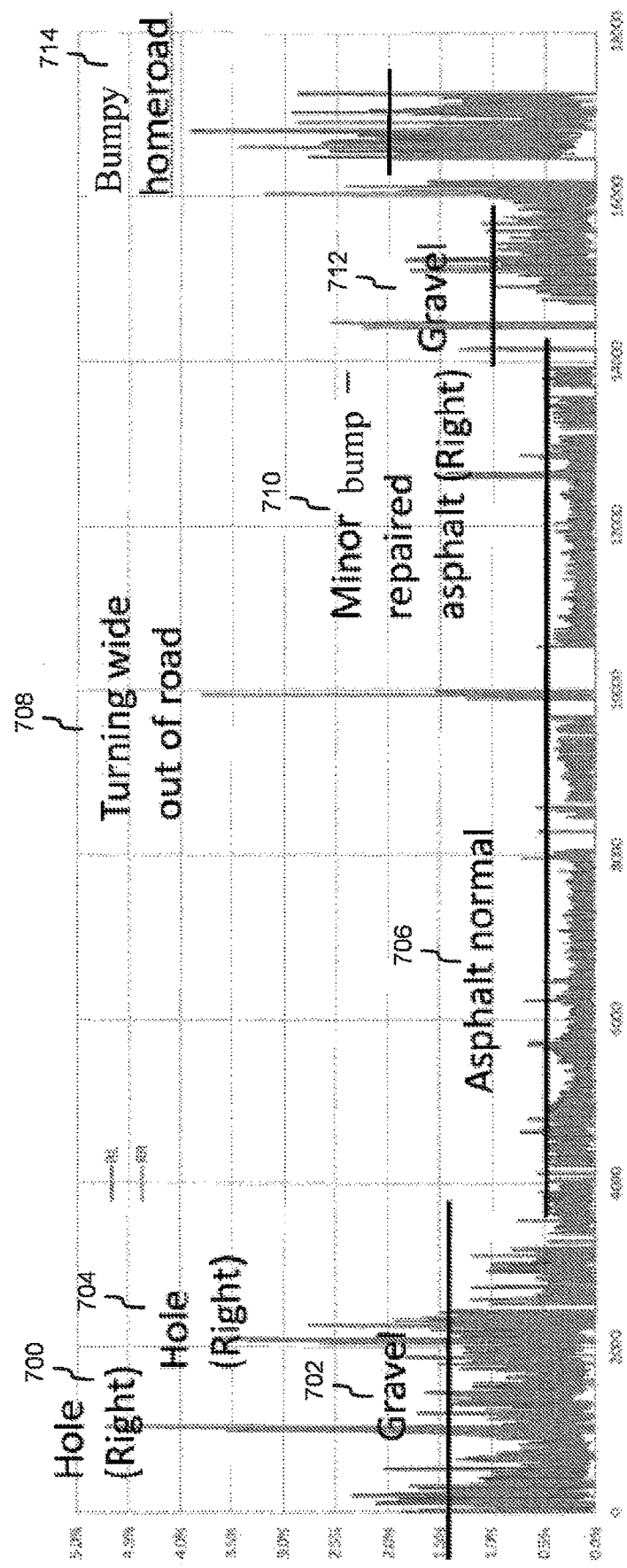
FIG. 7 illustrates examples of possible irregularities associated with a road.

FIG. 7 illustrates examples of possible irregularities associated with a road. The y axis represents wheel speed percentual impulse. The x axis represents a wheel speed message count.

References 700 and 704 identify specific holes or potholes in an analyzed position in a road or road segment. A higher reading in the y axis indicated a more severe hole or pothole. References 702 and 712 identifies a more general section of the road or road segment, for example, gravel. A reference 706 identifies a normal asphalt section of the road or road segment. As can be seen from FIG. 7, values in the y axis are the lowest in the asphalt section. This means that the asphalt section is the smoothest surface in this example. A reference 706 identifies a wide turn out of the road. A reference 710 identifies a minor bump in a repaired asphalt on the right side of the vehicle. Finally, a reference 714 identifies a bumpy home road section.

Figure 8:
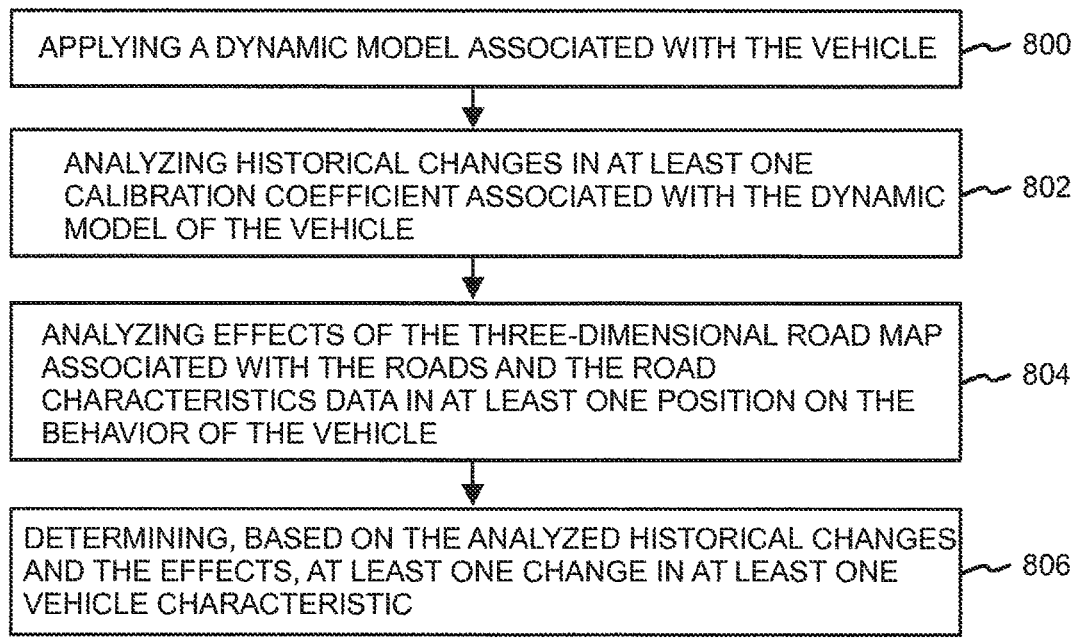
FIG. 8 illustrates a computer-implemented method for condition monitoring of a vehicle.

FIG. 8 illustrates a computer-implemented method for condition monitoring of a vehicle.

At 800, a dynamic model associated with a vehicle discussed above is applied. The vehicle may be any vehicle travelling on a road, for example, an autonomous vehicle, a passenger car, a truck, a motorcycle etc. As already discussed, the dynamic model has been determined by obtaining status information from at least one information bus of the vehicle, the status information providing real-time status information about the vehicle, obtaining, based on vehicle identity information, vehicle dynamics information, obtaining map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data. The map data may comprise map data that has been enhanced using the solution discussed in more detail in relation to FIG. 6. In other words, the map data may comprise accurate information about roads, for example, road inclination data, road irregularity data etc.

At 802, historical changes in at least one calibration parameter associated with the dynamic model of the vehicle are analyzed.

At 804, effects of the three-dimensional road map associated with the roads and the road characteristics data in at least one position on the behavior of the vehicle are analyzed.

At 806, at least one change in at least one vehicle characteristic is determined based on the analyzed historical changes and the effects.

The dynamic model of the vehicle defines a set of vehicle-specific calibration parameters discussed in more detail in relation to FIG. 2. These calibration parameters represent how the vehicle behaves in various driving situations.

In one embodiment, the at least one calibration parameter comprises calibration parameters associated with elasticity of a tyre and a dynamic track width, and determining, based on the analyzed historical changes and the effects, at least one change in at least one vehicle characteristic comprises determining at least one change in a tyre characteristic. For example, when the vehicle travels in a curve, a behavior of a tyre is dependent on a structural rigidity in both longitudinal and lateral directions and on tyre pressure. Thus, by analyzing the elasticity of the tyre and the dynamic track width, it is possible to detect a development as the tyre wears, for example, a reduction in tyre pressure or a tyre body damage.

Further, it may also be possible to detect track width and tyre alignment changes caused by changes in the chassis of the vehicle by analyzing changes in one or more calibration parameters, for example, in a track width calibration parameter. The track width calibration parameter calibrates, for example, when comparing a calculated turning angle of the vehicle to a turning angle identified by map data.

In one embodiment, the at least one calibration parameter comprises a tyre-specific speed and/or distance calibration parameter, and determining, based on the analyzed historical changes and the effects, at least one change in at least one vehicle characteristic comprises determining at least one change in a tyre characteristic. In an embodiment, the at least one change in the tyre characteristic comprises at least one of the following: a reduced tyre pressure, a tyre imbalance, a shock absorber fault, a fault in a chassis of the vehicle, deformation of a tyre, a wear of a tyre, an uneven wear of a tyre, and a tyre body damage. Compared, for example, to existing automatic tyre pressure detection solutions, the disclosed solution using the dynamic model of the vehicle and enhanced map data enables a more accurate and sensitive detection of reduced tyre pressure.

Further, faults associated with tyre balancing and/or tyre shape may cause to a momentary speed of rotation of a tyre or tyres recurring changes that occur at a frequency corresponding to the speed of rotation. These changes may be used as observations stored in a back-end system. The back-end system may then compare these observations with historical data stored relating to the vehicle while taking into account the dynamical model of the vehicle and map data comprising three-dimensional road map associated with roads and road characteristics data. The comparison then enables to determine possible changes, for example, in tyre balancing and tyre body.

In one embodiment, changes in the momentary speed of rotation of a tyre or tyres that do not occur at a frequency corresponding to the speed of rotation may be regarded as "other faults" or "other defects". These faults or defects may comprise, for example, various chassis associated faults that may cause different outcomes in different driving conditions. It is possible to store the changes in the in the momentary speed of rotation of a tyre or tyres, occurring frequency of the changes and also the location and situation of the vehicle when the changes occur. The system providing the analysis may be taught to deduce the most probable faults caused by various changes. For example, a fault in a shock absorber can be seen in the change of the speed of rotation of a tyre, while the frequency associated with the change is not directly bound to the speed of rotation. Instead, it is bound to the characteristic frequency of the spring/mass combinations. Further, system may use confirmed observations as teaching material in an artificial intelligence tool. The tool may then later be used to determine fault assessments to various users experiencing similar situations.

In one embodiment, it may be possible to detect a dragging brake with the disclosed dynamic model of the vehicle. When a brake drags, the dynamic model of the vehicle shows a situation in which the speed and/or distance calibration parameter of one or more tyres changes with respect to historical data associated with the vehicle. The dragging brake may show as a reduction in the speed of rotation due to the transformation of the tyre and the slide of the tyre. The dragging brake may also be determined based on an increase in a driving resistance coefficient. In some embodiments, due to the dragging of the brake, it may also cause a decelerating speed change occurring at a frequency corresponding with the speed of rotation of the tyre, caused by a twisted brake disc or brake drum. When the driving resistance coefficient increases, it can be seen that the vehicle needs more power to move. Generally speaking, the driving resistance can be divided into a rolling resistance and an air drag, and the dragging brake can be determined based on an increase in the rolling resistance.

In one embodiment, multiples of the frequency of the speed of rotation of the tyre may be caused by stuck pistons of a brake caliper which bends the brake disc or other drive shaft or powertrain faults.

Any of the above illustrated observations may be used as teaching material for the artificial intelligence tool.

Figure 9:
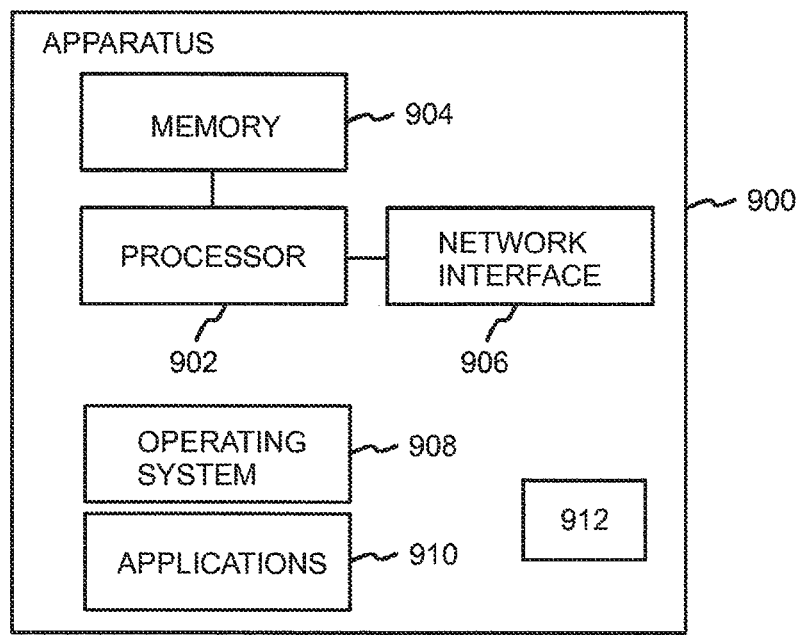
FIG. 9 illustrates a system diagram depicting an exemplary apparatus according to an aspect.

FIG. 9 illustrates a system diagram depicting an exemplary apparatus 900 including a variety of optional hardware and software components, shown generally at 912. Any components 912 in the apparatus can communicate with any other component, although not all connections are shown, for ease of illustration. The apparatus 900 can be any of a variety of computing devices (for example, a computer, a cloud based server etc.) and can allow two-way communications with one or more communications networks, such as the Internet.

The illustrated apparatus 900 can include one or more controllers or processors 902 (e.g., signal processor, microprocessor, ASIC, or other control and processing logic circuitry) for performing such tasks as signal coding, data processing, input/output processing, power control, and/or other functions. An operating system 908 can control the allocation and usage of the components 912 and support for one or more application programs 910. The application programs can include common computing applications (e.g., server software), or any other computing application.

The illustrated apparatus 900 can include a memory 904. The memory 904 can include non-removable memory and/or removable memory. The non-removable memory can include RAM, ROM, flash memory, a hard disk, or other well-known memory storage technologies. The removable memory can include flash memory or other well-known memory storage technologies. The memory 904 can be used for storing data and/or code for running the operating system 908 and the applications 910. Example data can include web pages, text, images, sound files, video data, or other data sets to be sent to and/or received from one or more network servers or other devices via one or more wired or wireless networks.

The apparatus 900 can further include at least one physical connector, which can be a USB port, IEEE 1394 (FireWire) port, and/or RS-232 port etc.

The illustrated components 912 are not required or all-inclusive, as any components can deleted and other components can be added.

The apparatus 900 may be configured to implement the various features, examples and embodiments illustrated in FIGS. 1-8 partially or completely. The functionality described herein can be performed, at least in part, by one or more computer program product components such as software components. According to an example, the processor 902 may be configured by the program code which when executed performs the examples and embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Further, one or more of the disclosed elements or components of the apparatus 900 may constitute means for applying a dynamic model associated with the vehicle, the dynamic model having been determined by obtaining status information originating from at least one information bus of the vehicle, the status information providing real-time status information about the vehicle during the use of the vehicle, obtaining, based on vehicle identity information, vehicle dynamics information providing characteristics associated with the vehicle, obtain map data representing road characteristics of roads of a geographical area, the map data comprising two-dimensional road map data, three-dimensional road map associated with the roads, and road characteristics data, analyzing behavior of the vehicle based on the status information and the vehicle dynamics information, and computing a dynamic model for the vehicle by comparing the behavior of the vehicle to the map data, the dynamic model enabling at least one of an estimation of the performance of the vehicle, observation of changes associated with the vehicle and observation of changes in driving conditions of the vehicle; means for analyzing historical changes in at least one calibration parameter associated with the dynamic model of the vehicle; means for analyzing effects of the three-dimensional road map associated with the roads and the road characteristics data in at least one position on the behavior of the vehicle; and means for determining, based on the analyzed historical changes and the effects, at least one change in at least one vehicle characteristic.

The functionality of the apparatus 900 may be implemented by program instructions stored on a computer readable medium. The program instructions, when executed, cause the computer, processor or the like, to perform the disclosed steps or functionality. The computer readable medium can be any medium, including non-transitory storage media, on which the program is stored such as a Blu-Ray disc, DVD, CD, USB (flash) drive, hard disc, server storage available via a network, a ROM, a PROM, an EPROM, an EEPROM or a Flash memory having electronically readable control signals stored thereon which cooperate or are capable of cooperating with a programmable computer system such that an embodiment of at least one of the inventive methods is performed. An embodiment of the invention comprises or is a computer program comprising program code for performing any of the methods described herein, when executed on a computer. Another example of the invention comprises or is a computer readable medium comprising a program code that, when executed by a processor, causes an apparatus to perform any of the methods described herein.

In one embodiment, the apparatus 900 comprises a vehicle navigator apparatus. The vehicle navigator device may receive the status information from at least one information bus of the vehicle. Then, the vehicle navigator device may comprise the dynamical model of the vehicle, and the dynamical model may calculate the actual direction and speed of the vehicle based on the vehicle dynamics information and the map data. By applying the illustrated solution, the vehicle navigator apparatus always stays on a correct driving lane. Further, the illustrated solution also removes the problem of determining of a correct direction, for example, when driving in cities. In another embodiment, the apparatus 900 may be a computer, a computer system or a back-end system that collects information about one or more vehicles and analyzes the collected information to determine at least one change in at least one vehicle characteristic.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

Although the invention and its advantages have been described in detail with reference to specific features and embodiments thereof, it is evident that various changes, modifications, substitutions, combinations and alterations can be made thereto without departing from the spirit and scope of the invention as defined by the appended claims. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A computer-implemented method for condition monitoring of a vehicle, the method comprising:
   applying a dynamic model associated with a vehicle, the dynamic model having been determined by obtaining status information originating from at least one information bus of the vehicle, the status information providing real-time status information about the vehicle during the use of the vehicle;; obtaining, based on vehicle identity information, vehicle dynamics information providing characteristics associated with the vehicle;
   obtaining map data representing road characteristics of roads of a geographical area, the map data comprising two-dimensional road map data, three-dimensional road map associated with the roads, and road characteristics data;, analyzing behavior of the vehicle based on the status information and the vehicle dynamics information; and computing the dynamic model for the vehicle by comparing the behavior of the vehicle to the map data, the dynamic model enabling at least one of an estimation of the performance of the vehicle, observation of changes associated with the vehicle and observation of changes in driving conditions of the vehicle;
   analyzing historical changes in at least one calibration parameter associated with the dynamic model of the vehicle;
   analyzing effects of the three-dimensional road map associated with the roads and the road characteristics data in at least one position on the behavior of the vehicle; and
   determining, based on the analyzed historical changes and the effects, at least one change in at least one vehicle characteristic.

2. The method of claim 1, wherein the status information comprises at least one of a motor power, tyre speeds, a steering wheel position, vehicle system information, traction control information, vehicle stabilization system information and anti-lock braking system information.

3. The method of claim 1, wherein obtaining, based on vehicle identity information, vehicle dynamics information comprises obtaining initial vehicle dynamics information associated with a model or type of the vehicle from at least one external data source.

4. The method of claim 1, wherein obtaining, based on vehicle identity information, vehicle dynamics information comprises obtaining supplemental vehicle dynamics information based on real-time vehicle dynamics data obtained from the vehicle.

5. The method of claim 1, wherein the road characteristics data comprises at least one of road quality data, road irregularity data and data about local deviations associated with the road.

6. The method of claim 1, wherein the method further comprises combining the dynamic model with the road characteristics data to enhance the calculation of the position of the vehicle.

7. The method of claim 1, wherein the three-dimensional road data comprises road inclination data, and the method further comprises combining the dynamic model with the road inclination data to enhance the calculation of the position of the vehicle.

8. The method of claim 1, wherein the at least one calibration parameter comprises calibration parameters associated with an elasticity of a tyre and a dynamic track width, and determining, based on the analyzed historical changes and the effects, at least one change in at least one vehicle characteristic comprises determining at least one change in a tyre characteristic.

9. The method of claim 1, wherein the at least one calibration parameter comprises a tyre-specific speed and/or distance calibration parameter, and determining, based on the analyzed historical changes and the effects, at least one change in at least one vehicle characteristic comprises determining at least one change in a tyre characteristic.

10. The method of claim 8, wherein the at least one change in the tyre characteristic comprises at least one of the following: a reduced tyre pressure, a tyre imbalance, a shock absorber fault, a fault in a chassis of the vehicle, deformation of a tyre, a wear of a tyre, an uneven wear of a tyre, and a tyre body damage.

11. The method of claim 1, wherein the at least one calibration parameter comprises a speed and/or distance calibration parameter of at least one tyre of the vehicle, and determining, based on the analyzed historical changes and the effects, at least one change in at least one vehicle characteristic comprises determining a dragging brake associated with at least one tyre.

12. An apparatus for condition monitoring of a vehicle, the apparatus comprising:
at least one processor;
at least one memory connected to the at least one processor;
wherein the at least one memory stores program instructions that, when executed by the at least one processor, cause the apparatus to:
apply a dynamic model associated with a vehicle, the dynamic model having been determined by obtaining status information originating from at least one information bus of the vehicle, the status information providing real-time status information about the vehicle during the use of the vehicle, obtaining, based on vehicle identity information, vehicle dynamics information providing characteristics associated with the vehicle, obtaining map data representing road characteristics of roads of a geographical area, the map data comprising two-dimensional road map data, three-dimensional road map associated with the roads, and road characteristics data, analyze behavior of the vehicle based on the status information and the vehicle dynamics information, and compute a dynamic model for the vehicle by comparing the behavior of the vehicle to the map data, the dynamic model enabling at least one of an estimation of the performance of the vehicle, observation of changes associated with the vehicle and observation of changes in driving conditions of the vehicle;
analyze historical changes in at least one calibration parameter associated with the dynamic model of the vehicle;
analyze effects of the three-dimensional road map associated with the roads and the road characteristics data in at least one position on the behavior of the vehicle; and
determine, based on the analyzed historical changes and the effects, at least one change in at least one vehicle characteristic.

13. The apparatus of claim 12, wherein the status information comprises at least one of a motor power, tyre speeds, a steering wheel position, vehicle system information, traction control information, vehicle stabilization system information and anti-lock braking system information.

14. The apparatus of claim 12, wherein obtaining, based on vehicle identity information, vehicle dynamics information comprises obtaining initial vehicle dynamics information associated with a model or type of the vehicle from at least one external data source.

15. The apparatus of claim 12, wherein obtaining, based on vehicle identity information, vehicle dynamics information comprises obtaining supplemental vehicle dynamics information based on real-time vehicle dynamics data obtained from the vehicle.

16. The apparatus of claim 12, wherein the road characteristics data comprises at least one of road quality data, road irregularity data and data about local deviations associated with the road.

17. The apparatus of claim 16, wherein the at least one memory stores program instructions that, when executed by the at least one processor, cause the apparatus to combine the dynamic model with the road characteristics data to enhance the calculation of the position of the vehicle.

18. The apparatus of claim 12, wherein the three-dimensional road data comprises road inclination data, and the method further comprises combining the dynamic model with the road inclination data to enhance the calculation of the position of the vehicle.

19. The apparatus of claim 12, wherein the at least one calibration parameter comprises calibration parameters associated with an elasticity of a tyre and a dynamic track width, and determining, based on the analyzed historical changes and the effects, at least one change in at least one vehicle characteristic comprises determining at least one change in a tyre characteristic.

20. The apparatus of claim 12, wherein the at least one calibration parameter comprises a tyre-specific speed and/or distance calibration parameter, and determining, based on the analyzed historical changes and the effects, at least one change in at least one vehicle characteristic comprises determining at least one change in a tyre characteristic.

21. The apparatus of claim 19, wherein the at least one change in the tyre characteristic comprises at least one of the following: a reduced tyre pressure, a tyre imbalance, a shock absorber fault, a fault in a chassis of the vehicle, deformation of a tyre, a wear of a tyre, an uneven wear of a tyre, and a tyre body damage.

22. The apparatus of claim 12, wherein the at least one calibration parameter comprises a speed and/or distance calibration parameter of at least one tyre of the vehicle, and determining, based on the analyzed historical changes and the effects, at least one change in at least one vehicle characteristic comprises determining a dragging brake associated with at least one tyre.

23. A non-transitory computer program comprising program code which, when the program is executed by a computer, cause the computer to carry out the method of claim 1.

24. A non-transitory computer-readable medium comprising instructions which, when, executed by a computer, cause the computer to carry out the method of a claim 1.

* * * * *